(12) United States Patent
Raza et al.

(10) Patent No.: US 10,334,550 B2
(45) Date of Patent: Jun. 25, 2019

(54) DETECTION IN DYNAMIC CHANNELS WITH HIGH CARRIER FREQUENCY OFFSET

(71) Applicant: ONE MEDIA, LLC, Hunt Valley, MD (US)

(72) Inventors: Zahir Jaffer Raza, Waterloo (CA); Michael J. Simon, Frederick, MD (US); Kevin A. Shelby, Austin, TX (US); Sandeep Mavuduru Kannappa, San Diego, CA (US)

(73) Assignee: One Media, LLC, Hunt Valley, MD (US)

( * ) Notice: Subject to any disclaimer, the term of this patent is extended or adjusted under 35 U.S.C. 154(b) by 240 days.

(21) Appl. No.: 15/278,594

(22) Filed: Sep. 28, 2016

(65) Prior Publication Data

US 2017/0094623 A1 Mar. 30, 2017

Related U.S. Application Data

(60) Provisional application No. 62/233,584, filed on Sep. 28, 2015.

(51) Int. Cl.
*H04W 56/00* (2009.01)
*H04L 1/00* (2006.01)
(Continued)

(52) U.S. Cl.
CPC ......... *H04W 56/004* (2013.01); *H04L 1/0058* (2013.01); *H04L 5/0048* (2013.01); *H04L 27/227* (2013.01); *H04L 27/233* (2013.01); *H04L 27/2628* (2013.01); *H04L 27/3818* (2013.01); *H04L 27/3845* (2013.01); *H04W 56/001* (2013.01); *H04W 56/0055* (2013.01)

(58) Field of Classification Search
CPC ........... H04J 3/0685; H04L 2027/0065; H04L 27/233; H04L 27/3845; H04L 27/3818; H04L 27/227; H04L 1/0058; H04L 27/2628; H04L 5/0048; H04B 1/708; H04W 56/004; H04W 56/001; H04W 56/0055
See application file for complete search history.

(56) References Cited

U.S. PATENT DOCUMENTS

| | | | | |
|---|---|---|---|---|
| 5,517,530 A | * | 5/1996 | Gardner | H04L 27/22 375/325 |
| 2004/0218699 A1 | * | 11/2004 | Carsello | H04L 7/042 375/343 |

(Continued)

OTHER PUBLICATIONS

International Search Report and Written Opinion, dated Dec. 13, 2016, for International Application No. PCT/US2016/053978, 11 pages.

*Primary Examiner* — Will W Lin
(74) *Attorney, Agent, or Firm* — Sterne, Kessler, Goldstein & Fox, PLLC

(57) ABSTRACT

Method and apparatus for signal detection in dynamic channels with high carrier frequency offset are provided. A coherent detector and a non-coherent detector are operated in parallel on a block of samples of an input signal to determine respective time offset candidates of the input signal. The time offset candidate obtained from the non-coherent detector is used to determine a frequency offset candidate of the input signal.

24 Claims, 7 Drawing Sheets

(51) Int. Cl.
*H04L 5/00* (2006.01)
*H04L 27/26* (2006.01)
*H04L 27/227* (2006.01)
*H04L 27/233* (2006.01)
*H04L 27/38* (2006.01)

(56) References Cited

U.S. PATENT DOCUMENTS

2009/0086713 A1* 4/2009 Luo ..................... H04J 11/0073
 370/350
2012/0093208 A1* 4/2012 Wu ....................... H04L 1/0036
 375/224
2016/0204852 A1* 7/2016 Grant ................. H04B 7/18539
 370/252

* cited by examiner

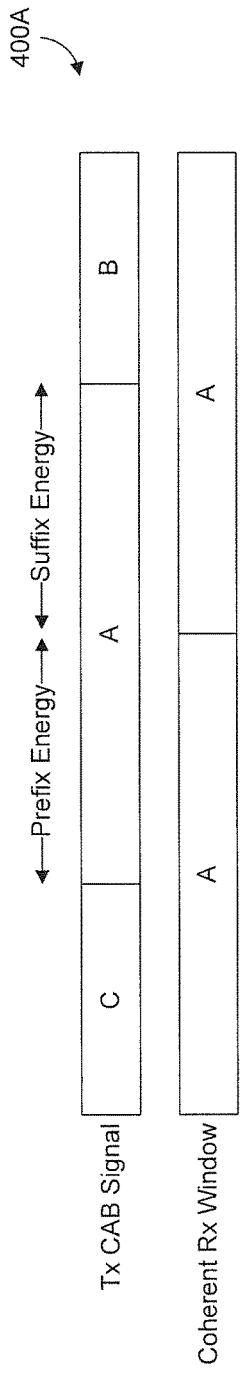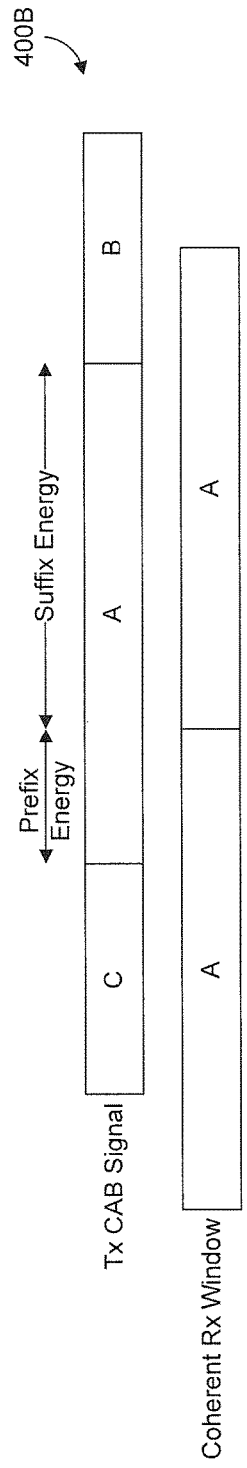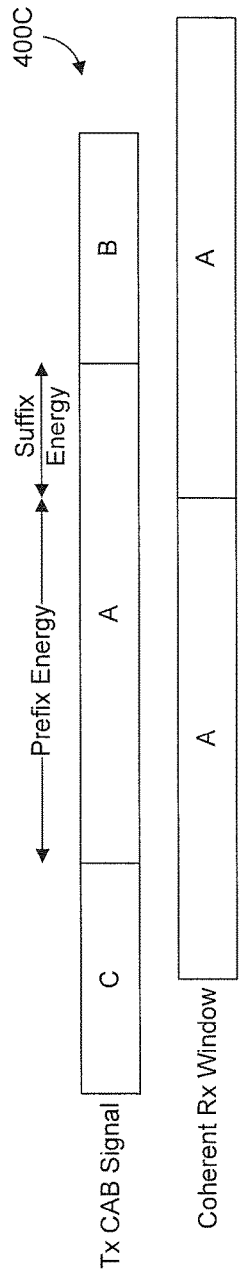
FIG. 4A
FIG. 4B
FIG. 4C

DETECTION IN DYNAMIC CHANNELS WITH HIGH CARRIER FREQUENCY OFFSET

CROSS-REFERENCE TO RELATED APPLICATIONS

The present application claims the benefit of U.S. Provisional Application No. 62/233,584, filed Sep. 28, 2015, which is incorporated herein by reference in its entirety.

TECHNICAL FIELD

The present disclosure relates generally to wireless signal detection.

BACKGROUND

Communication receivers are initiated by synchronizing to a transmitted, often known, synchronization signal. Synchronization is performed by signal detectors, also referred to as searchers, that attempt to detect then synchronize to the transmitted signal. Detectors attempt to resolve at least two ambiguities or unknowns at initiation: the timing of the transmitted signal and the frequency of the transmitted signal, both with respect to the receiver's timing and frequency.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

FIGS. 4A-4C illustrate example coherent correlation scenarios.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

Figure 1:
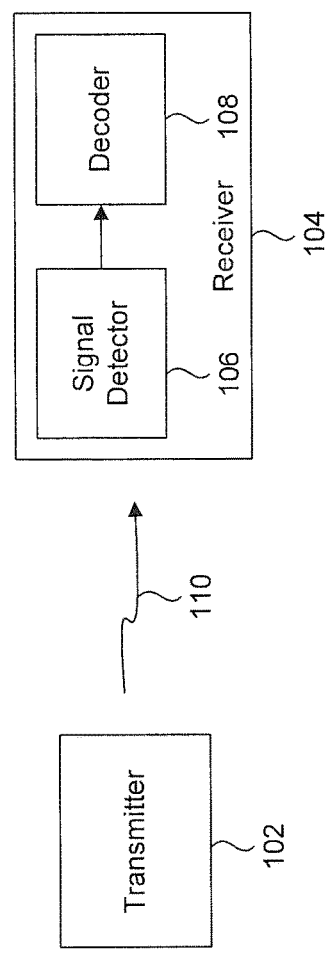
FIG. 1 illustrates an example wireless system according to an embodiment.

FIG. 1 illustrates an example wireless system 100 according to an embodiment. Example wireless system 100 is provided for the purpose of illustration only and is not limiting of embodiments of the present disclosure. As shown in FIG. 1, example wireless system 100 includes a transmitter 102 and a receiver 104. Receiver 104 may include a signal detector 106 and a decoder 108. Transmitter 102 transmits a wireless signal 110 to receiver 104. Before receiver 104 can decode wireless signal 110 to retrieve information contained therein, receiver 104 must first detect wireless signal 110.

Signal detector 106 is configured to detect wireless signal 110. In an embodiment, wireless signal 110 includes a portion that is known to receiver 104 that is used by signal detector 106 to detect wireless signal 110. This portion is generally referred to as a synchronization signal. An example of signal detector 106 may be an Advanced Television Systems Committee (ATSC) v3.0 bootstrap detector configured to detect a bootstrap of a frame preamble having a time domain structure of the form CAB-BCA as described below.

Typically, signal detector 106 attempts to resolve at least two ambiguities or unknowns in the synchronization signal: the timing and the frequency of the synchronization signal relative respectively to the timing and frequency of receiver 104. These parameters are also commonly referred to as the time offset and the frequency offset of the synchronization signal.

Generally, the performance of signal detector 106 sets a bound of operation for receiver 104, as without the ability to detect the synchronization signal or the bootstrap, receiver 104 is unable to synchronize in time and frequency to wireless signal 110. In particular, the ambiguity in frequency, when relatively large, imposes a design challenge on signal detector 106. As an example, ATSC 3.0 prescribes a tolerance in the carrier frequency offset (CFO) of up-to 200 KHz, i.e., the variance in the carrier frequency between transmitter 102 and receiver 104 can be up to 200 KHz. With such a large potential CFO, a simple coherent, or matched filter, detector may not be able to resolve the frequency ambiguity in the synchronization signal, and a more complex non-coherent detector may be needed.

Figure 2:
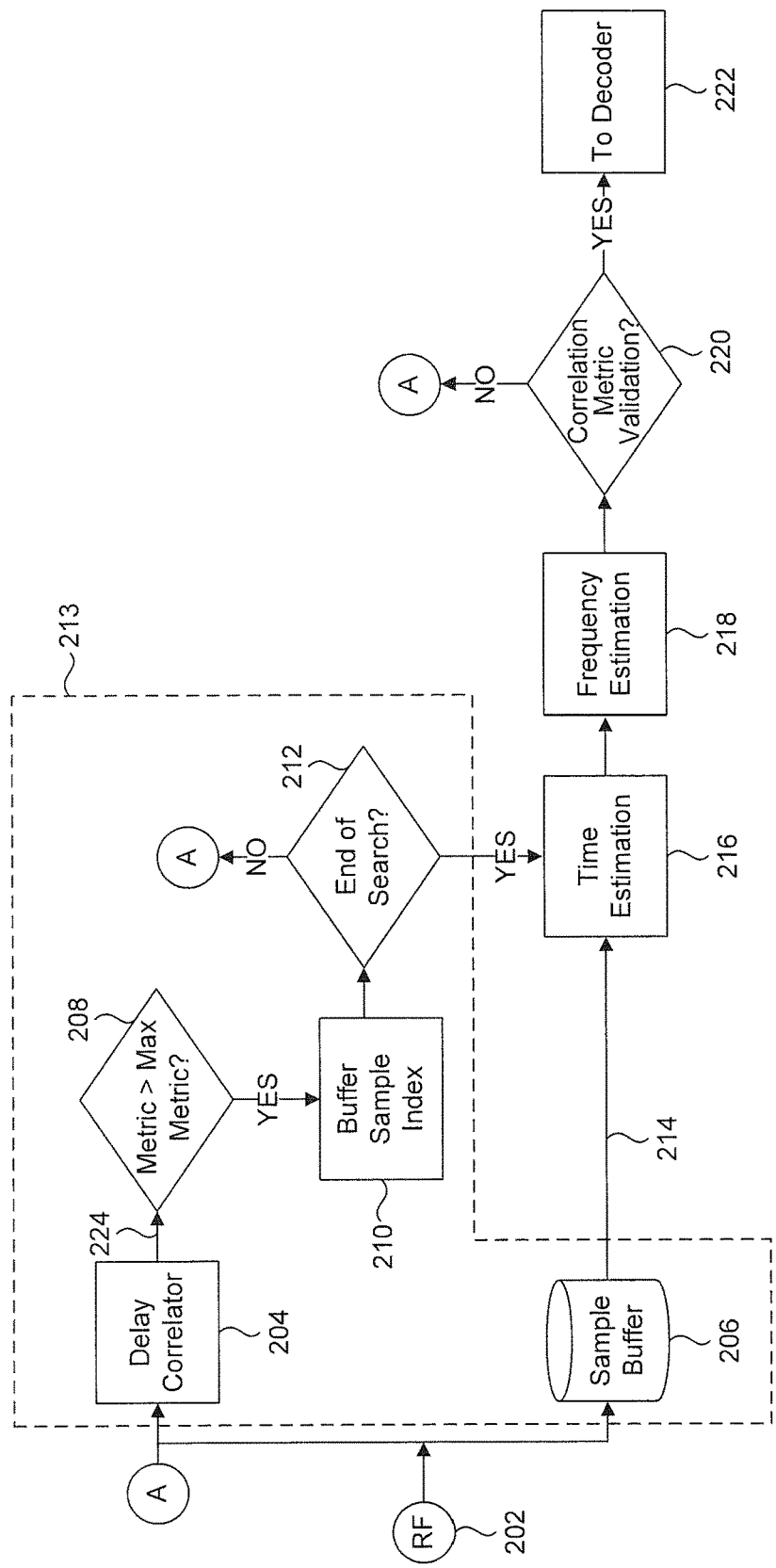
FIG. 2 illustrates an example signal detector.

FIG. 2 illustrates an example signal detector 200. In an embodiment, signal detector 200 may be used to detect the bootstrap of a frame preamble of an ATSC 3.0 frame. The bootstrap is positioned at the beginning of the frame preamble and includes a number of symbols, beginning with a synchronization symbol. In an embodiment, signal detector 200 is configured to detect the synchronization symbol of the bootstrap to enable coarse time synchronization and frequency offset estimation.

As shown in FIG. 2, signal detector 200 includes a delay correlator circuit 204, a sample buffer 206, a comparison block 208, a buffer block 210, a search block 212, a time estimation circuit 216, a frequency estimation circuit 218, a correlation metric validation block 220, and a decoder interface block 222. In an embodiment, delay correlator circuit 204, sample buffer 206, comparison block 208, buffer block 210, and search block 212 form a non-coherent detector circuit 213.

As shown in FIG. 2, signal detector 200 receives a signal 202. In an embodiment, signal 202 includes a block of samples of the bootstrap. Signal 202 is provided to delay correlator circuit 204 and sample buffer 206. Sample buffer 206 stores signal 202 until delay correlator circuit 204 terminates its processing of the block of samples.

In an embodiment, delay correlator circuit 204 is a non-coherent correlator. As such, delay correlator circuit 204 uses known inherent characteristics of the transmitted frame preamble to detect the bootstrap synchronization symbol. Specifically, delay correlator circuit 204 attempts to detect energy in signal 202 that conforms to known inherent characteristics of the bootstrap. In ATSC 3.0, each bootstrap symbol is composed of three parts A, B, and C of time domain samples. Parts B and C are derived from part A using defined frequency shift and phase shift. The bootstrap synchronization symbol employs a C-A-B time domain structure (i.e., in the time domain, part C is followed by part A, which is followed by part B). Other bootstrap symbols use a B-C-A time domain structure. In an embodiment, delay correlator circuit 204 relies on a priori knowledge of the CAB-BCA time domain structure of the bootstrap to detect the bootstrap synchronization symbol. Specifically, delay correlator circuit 204 uses the known CAB-BCA structure to auto-correlate the block of samples contained in signal 202 with prescribed delay and frequency shift that resonate with that prescribed at the transmitter.

In an embodiment, delayed correlator circuit 204 computes statistics of the block of samples over a prescribed time (search period), typically the maximum length of the frame (e.g., 250 ms-5 s in ATSC 3.0). As shown in FIG. 2, in an embodiment, delay correlator circuit 204 calculates an auto-correlation metric 224 for each sample received over a search period of at least one frame. Auto-correlation metric 224 is provided to comparison block 208, which compares auto-correlation metric 224 to a current maximum auto-correlation metric. If auto-correlation metric 224 is greater than the current maximum auto-correlation metric, comparison block 208 updates the current maximum metric with auto-correlation metric 224 and provides a sample index associated with auto-correlation metric 224 to a buffer block 210, where the sample index is stored.

Subsequently, search block 212 determines whether the search has ended. If not, processing returns to delay correlator 204 to process a subsequent sample. Otherwise, the sample index with the maximum auto-correlation metric becomes a candidate that is processed by the timing and frequency estimators, and processing passes to time estimation circuit 216. The sample index with the maximum auto-correlation metric can be used to derive a coarse time offset estimate of signal 202.

Time estimation circuit 216 retrieves from sample buffer 206 samples 214 associated with the sample index with the maximum auto-correlation metric at the end of the search. Time estimation circuit 216 performs a time domain coherent correlation on the retrieved samples to resolve any remaining residual ambiguity in time. The result of this coherent correlation is a fine time offset estimate of signal 202. Subsequently, frequency estimation circuit 218 performs a frequency domain coherent correlation on the retrieved samples to determine a frequency offset of signal 202. The coherent correlation metrics resulting from time estimation circuit 216 and frequency estimation circuit 218 are validated in correlation metric validation block 220. Specifically, each metric is compared to a respective threshold to verify that the metric corresponds to an actual detection peak. If either metric is not validated in block 220, processing returns to delay correlator circuit 204 to process a subsequent sample. Otherwise, samples of signal 202 corresponding to the determined time and frequency offset, and indicating the beginning of the bootstrap of the frame preamble, are provided to the decoder via decoder interface block 222.

In example signal detector 200, discussed above, non-coherent detection is followed serially by coherent detection. While non-coherent detection achieves remarkable performance in high CFO conditions, a non-coherent detector generally underperforms in dynamic channels (e.g., fast fading channels).

Figure 3:
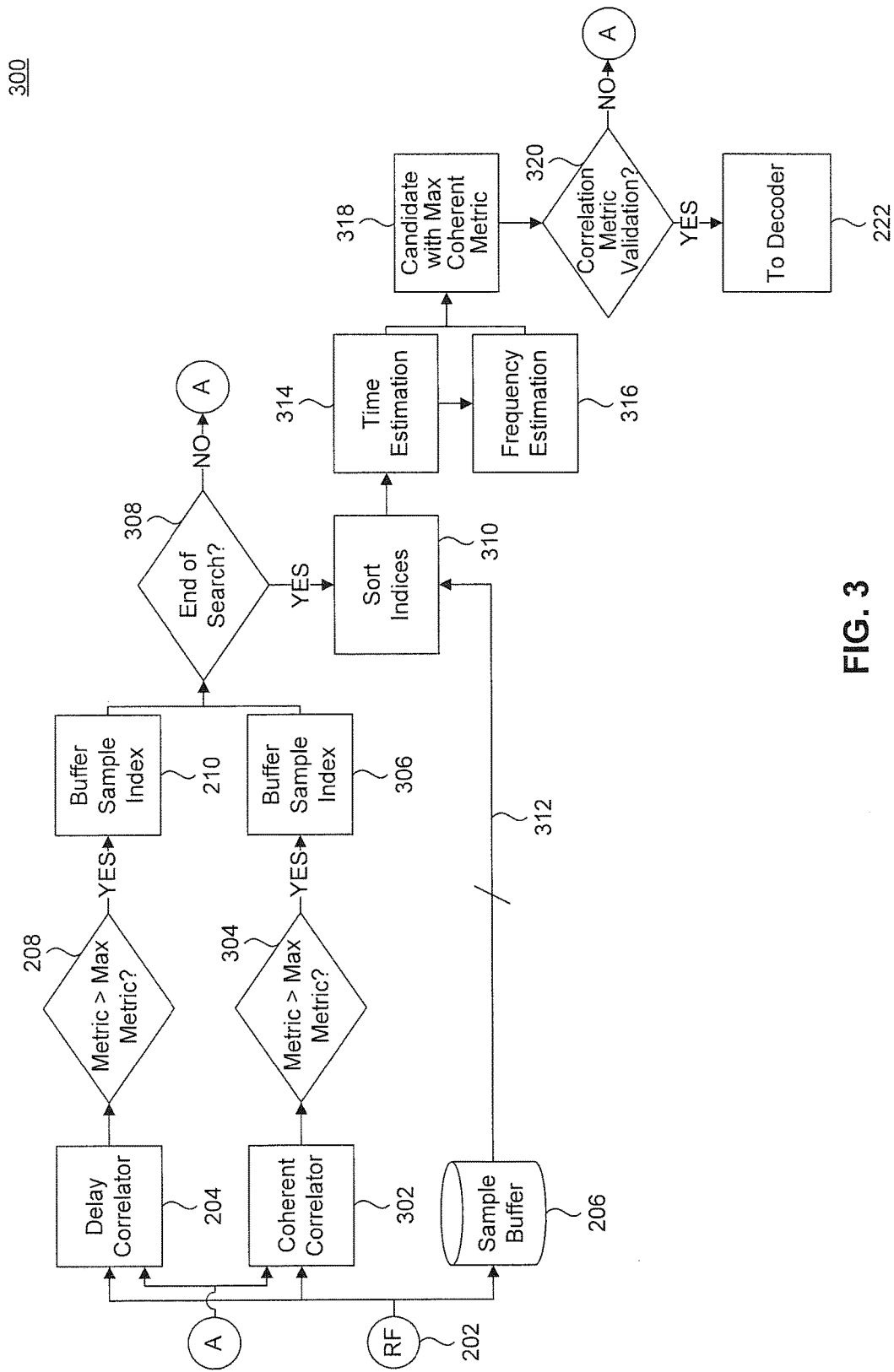
FIG. 3 illustrates another example signal detector according to an embodiment.

FIG. 3 illustrates another example signal detector 300 according to an embodiment. Example signal detector 300 is provided for the purpose of illustration only and is not limiting of embodiments. As further described below, example signal detector 300 improves detection performance in dynamic channels by performing non-coherent detection and coherent detection in parallel, thereby combining the advantages of the two types of detection. In an embodiment, signal detector 300 can be implemented by modifying signal detector 200 with a minimal increase in complexity.

As shown in FIG. 3, example signal detector 300 includes similar components as example signal detector 200 (e.g., delay correlator circuit 204, sample buffer 206, comparison block 208, buffer block 210, decoder interface block 222). Additionally, signal detector 300 includes a coherent correlator circuit 302, a comparison block 304, a buffer block 306, a search block 308, a sorting block 310, a time estimation circuit 314, a frequency estimation circuit 316, a candidate selection block 318, and a correlation metric validation block 320.

As further discussed below, signal detector 300 includes a coherent detector that determines a first time offset candidate and a non-coherent detector that determines a second time offset candidate. A third time offset candidate based on the first time offset candidate is also formed. The second time offset candidate, from the non-coherent detector, is used to determine a frequency offset of the received signal; and a time offset for the received signal is determined based on the first, second, and third time offset candidates.

Delay correlator circuit 204, sample buffer 206, comparison block 208, buffer block 210, and decoder interface block 222 operate in a similar fashion as discussed above with respect to example signal detector 200. Specifically, delay correlator circuit 204, comparison block 208, and buffer block 210 along with search block 308 (which operates like search block 212 discussed above) form a non-coherent detector circuit as discussed above with respect to FIG. 2. The non-coherent detector circuit is configured to determine a sample index with a maximum auto-correlation metric based on received signal 202. The sample index provides the second time offset candidate of received signal 202.

In an embodiment, to improve the second time offset candidate produced by the non-coherent detector circuit, an inherent timing error $\Delta$ of delay correlator circuit 204 is characterized by analyzing detector circuit 204 under the influence of additive white noise. For example, in ATSC 3.0, delay correlator circuit 204, under low signal to noise ratio (e.g., about −12 db), may have an inherent timing error of +/−252 (504/2); hence, $\Delta$ is set to 252. The inherent timing error $\Delta$ is subtracted from the second time offset candidate.

Figure 5:
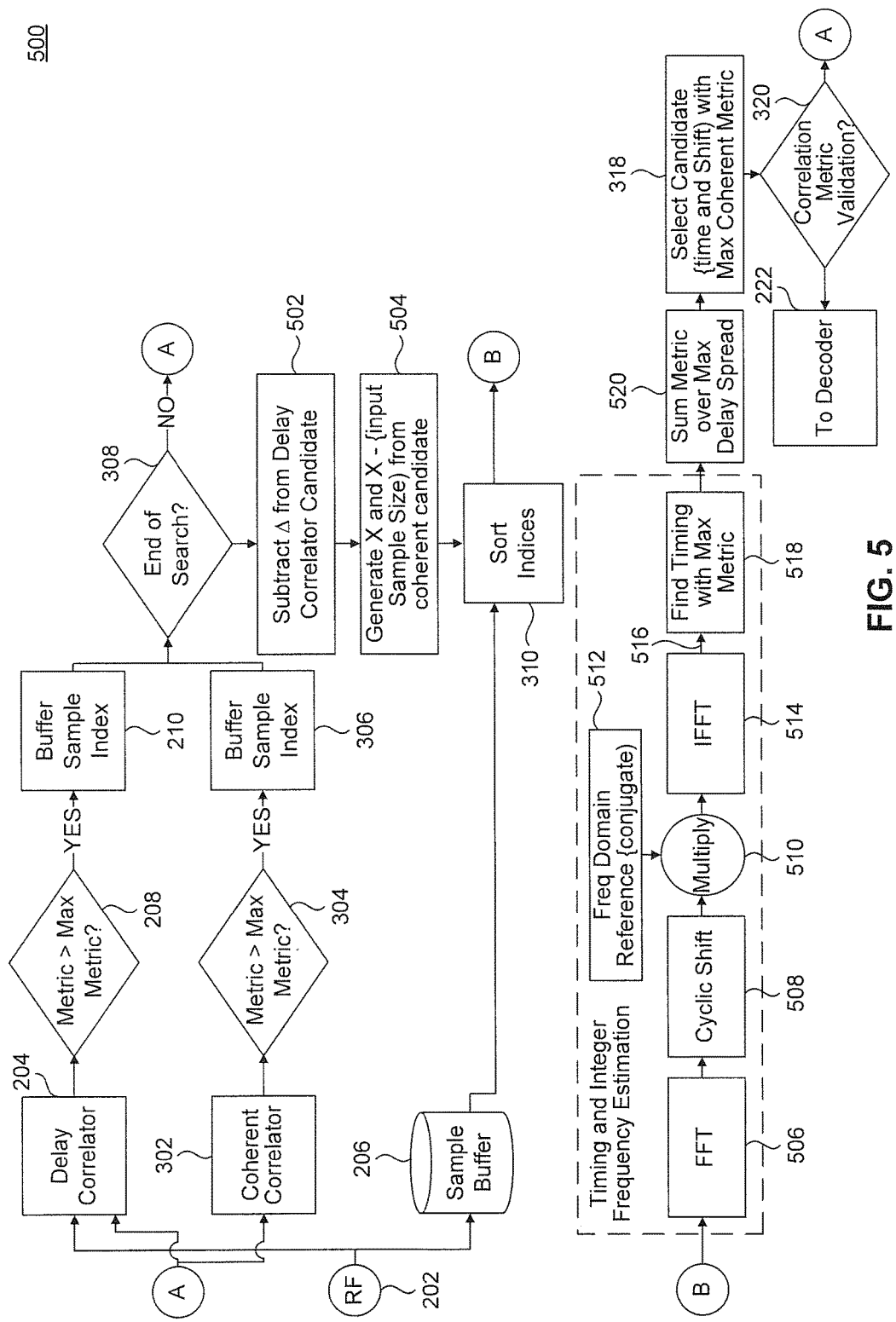
FIG. 5 illustrates another example signal detector according to an embodiment.

In an embodiment, as shown in FIG. 5 which illustrates an embodiment 500 of signal detector 300, a subtractor circuit 502 subtracts the inherent timing error $\Delta$ from the second time offset candidate at the end of the non-coherent detector search. Subtracting the inherent timing error $\Delta$ from the second time offset candidate increases the energy matched by the coherent detectors used in the timing and frequency estimation stage.

Returning again to FIG. 3, coherent correlator circuit 302, comparison block 304, buffer block 306, and search block 308 form a coherent detector circuit. The coherent detector circuit receives and processes signal 202 in parallel with the non-coherent detector circuit (formed by delay correlator circuit 204, comparison block 208, buffer block 210, and search block 308) for the length of the search period. The coherent detector circuit is configured to process a block of samples of signal 202 to determine the first time offset candidate of signal 202.

In an embodiment, e.g., for ATSC 3.0, the block of samples consists of 2048 sequentially received samples of signal 202. In another embodiment, because the coherent detector circuit is run for the length of the search period, the block of samples processed by the coherent detector circuit can be contiguous and non-overlapping relative to both a previous block of samples processed by the coherent detector circuit and a subsequent block of samples to be processed by the coherent detector circuit. This results in a more efficient operation of the coherent detector circuit compared to existing approaches that use contiguous but overlapping input samples, such as used for example for Long Term Evolution (LTE) Primary Synchronization Symbol (PSS) or Physical Random Access Channel (PRACH) detection. Further, relaxing the requirement of having overlapping samples into the coherent detector circuit relaxes the real time requirements of the coherent detector circuit. For example, in ATSC 3.0, the coherent detector circuit operates on 2048 non-overlapping samples which affords the coherent detector circuit a processing time equal to (2048*sample rate) to compute the maximum correlation metric. In contrast, because of the overlapping samples requirement, existing LTE PSS or PRACH detectors must complete the computation in less time, which translates into more complex detector designs.

In an embodiment, the coherent detector circuit is configured to correlate the block of samples of signal 202 with a local reference signal. In an embodiment, the local reference signal includes part "A" of the ATSC 3.0 bootstrap symbol (as mentioned above, in ATSC 3.0, each bootstrap symbol is composed of three parts A, B, and C of time domain samples. Specifically, the bootstrap synchronization symbol employs a C-A-B time domain structure). In an embodiment, the coherent detector circuit performs a convolution operation between the block of samples of signal 202 and the local reference signal to determine a correlation peak. For each sample of the block of samples, the local reference signal is shifted by a corresponding sample index (corresponding to a respective time offset of signal 202), and the block of samples is multiplied with the shifted local reference signal in coherent correlator circuit 302. The multiplication result (correlation metric corresponding to the respective time offset) is compared to a current maximum correlation metric by comparison block 304. If the correlation metric is greater than the current maximum correlation metric, comparison block 304 updates the current maximum correlation metric with the correlation metric and provides the sample index associated with the correlation metric to buffer block 306, where the sample index is stored. Search block 308 determines if the search has been completed and returns processing to coherent correlator circuit 302, if the search is not yet complete, or to sorting block 310, if the search has been completed. At the end of the search, the sample index with the maximum correlation metric (maximum correlation from among a plurality of time offsets of signal 202) provides the first time offset candidate of received signal 202.

As mentioned above, the coherent detector circuit determines the first time offset candidate of received signal 202. However, because the coherent detector circuit is driven with contiguous non-overlapping samples of signal 202, the first time offset candidate has ambiguity as to whether detection was performed on the prefix or the suffix of part "A" contained in the local reference signal. FIGS. 4A, 4B, and 4C illustrate example coherent correlation scenarios to depict this ambiguity. FIG. 4A illustrates an example correlation scenario 400A where correlation between received signal 202, having the time domain structure C-A-B, and the local reference signal, consisting of two parts "A", benefits in equal energy amounts from the prefix and the suffix of part "A." FIG. 4B illustrates an example scenario 400B in which the correlation energy is due more to the suffix than the prefix of part "A". Conversely, FIG. 4C illustrates an example scenario 400C in which the correlation energy is dominated by energy due to the prefix more than the suffix of part "A".

In an embodiment, to resolve this ambiguity, a third time offset candidate is generated based on the first time offset candidate resulting from the coherent detection over the search period. In an embodiment, a sample index associated with the third time offset candidate is equal to a sample index associated with the first time offset candidate minus a sample size of the block of samples of signal 202. In ATSC 3.0, for example, the sample size may be equal to 2048. Thus, if the first time offset candidate sample index is X, the sample index of the third time offset candidate is X-2048. In an embodiment, as in embodiment 500 shown in FIG. 5 for example, a circuit 504 is provided to generate the third time offset candidate from the first time offset candidate at the end of the coherent detection search.

As further described below, the third time offset candidate is used, along with the first time offset candidate and the second time offset candidate, in a second stage of timing estimation. A maximum correlation metric determination is used to select a timing estimation of signal 202 based on these three candidates. The second time offset candidate only is used for integer frequency estimation in the frequency estimation stage; the first and third time offset candidates are processed using a cyclic shift of zero.

Returning to FIG. 3, at the end of the search period, processing passes to sorting block 310. Sorting block 310 sorts the sample indices associated with the first, second, and third time offset candidates resulting from the search. Additionally, sorting block 310 retrieves from sample buffer 206 blocks of sequential samples 312 associated with the first, second, and third time offset candidates. In an embodiment, a block of samples associated with, e.g., the first time offset candidate, may be a block of sequential samples of signal 202 that begins with the sample having the sample index associated with the first time offset candidate. In other words, the block of sequential samples corresponds to the input block of samples of signal 202 time compensated by the first time offset candidate. For simplification of presentation, the blocks of sequential samples 312 are referred to hereinafter as time offset compensated blocks of samples.

In an embodiment, the size of each of the time compensated blocks of samples 312 may be equal to a symbol size (e.g., 3072 samples in ATSC 3.0). In another embodiment, to reduce complexity, only the actual signal without guard intervals is used. Accordingly, the size of each time offset compensated block of samples 312 may be less than the symbol size. For example, in ATSC 3.0, only part A of the bootstrap symbol may be used resulting in 2048 sequential samples.

Sorting block 310 provides the time offset compensated blocks of samples 312 sequentially to time estimation circuit 314 and frequency estimation circuit 316. In an embodiment, time estimation circuit 314, frequency estimation circuit 316, and candidate selection block 318 form an estimation circuit. As further described below, the estimation circuit is configured to determine a frequency offset of signal 202 based on the second time offset candidate. Additionally, the estimation circuit is configured to generate first, second, and third correlation metrics corresponding respectively to the first, second, and third time offset candidates, and to select one of the first, second, and third time offset candidates as a time offset of signal 202 based on the first, second, and third correlation metrics.

In an embodiment, the estimation circuit is implemented as shown in embodiment 500 illustrated in FIG. 5. Because only the second time offset candidate is used to determine the frequency offset of signal 202, processing by the estimation circuit of the time offset compensated block of samples associated with the second time offset candidate differs from processing of the time offset compensated blocks of samples associated with the first and third time offset candidates as further discussed below.

Specifically, for the second time offset candidate, the processing includes an FFT circuit 506 performing a Fast Fourier Transform on the corresponding time offset compensated block of samples to generate frequency domain samples. Then, for each cyclic shift value of a plurality of cyclic shift values, a cyclic shift circuit 508 shifts the frequency domain samples by the cyclic shift value to generate cyclically shifted frequency domain samples. In an embodiment, each cyclic shift value resolves the frequency ambiguity by the FFT-Size/sample rate. In ATSC 3.0, for example, this is equal to 6.144 Mhz/2048=3000 Hz. In an embodiment, the cyclically shifted frequency domain samples are determined according to the equation $Y_i=X((i+C) \bmod \text{FFT-Size})$, where $Y_i$ represents the ith cyclically shifted frequency domain sample (i spanning 0 to FFT-size), X represents the frequency domain samples, and C is the cyclic shift value spanning −(FFT-Size) to +(FFT-Size). Subsequently, a multiplier 510 conjugate multiplies the cyclically shifted frequency domain samples by a frequency domain reference signal 512 to generate a conjugate multiplication result; and an Inverse FFT (IFFT) circuit 514 performs an inverse FFT on the conjugate multiplication result to generate an IFFT output 516. Circuit 518 determines a correlation value from the IFFT output 516.

At the end of the process, circuit 518 identifies a cyclic shift value from among the plurality of cyclic shift values that results in a maximum correlation value. The cyclic shift value provides the frequency offset of signal 202. Additionally, in an embodiment, the maximum correlation value corresponds to the second correlation metric associated with the second time offset candidate.

For the first and third time offset candidates, the corresponding time offset compensated blocks of samples are processed by the estimation circuit for a single cyclic shift value equal to zero. As such, after FFT circuit 506 performs an FFT on the time offset compensated block of samples to generate frequency domain samples, the frequency domain samples bypass cyclic shift circuit 508 and are directly multiplied by frequency domain reference signal 512, in multiplier 510, to generate a conjugate multiplication result. The conjugate multiplication result is transformed by IFFT circuit 514 to the time domain to generate IFFT output 516. IFFT output 516 is used by circuit 518 to determine a correlation value, which corresponds to the first time correlation metric when the time offset compensated block of samples corresponds to the block of samples compensated based on the first time offset candidate, and corresponds to the third correlation metric when the time offset compensated block of samples corresponds to the block of samples compensated based on the third time offset candidate.

Returning to FIG. 3, candidate selection block 318 receives the first, second and third correlation metrics from the estimation circuit and selects one of the first, second, and third time offset candidates as a time offset of signal 202 based on the first, second, and third correlation metrics. Specifically, candidate selection block 318 selects as the time offset the time offset candidate with the maximum correlation metric.

In an embodiment, the correlation metric for each of the first, second, and third time offset candidates is determined from a correlation value based on a maximum peak of the corresponding IFFT output 516. In another embodiment, to improve performance in dynamic channels, the estimation circuit includes a circuit 520 configured to determine the correlation value by summing the maximum correlation peak and one or more significant peaks corresponding to one or more main paths from the IFFT output.

Figure 6:
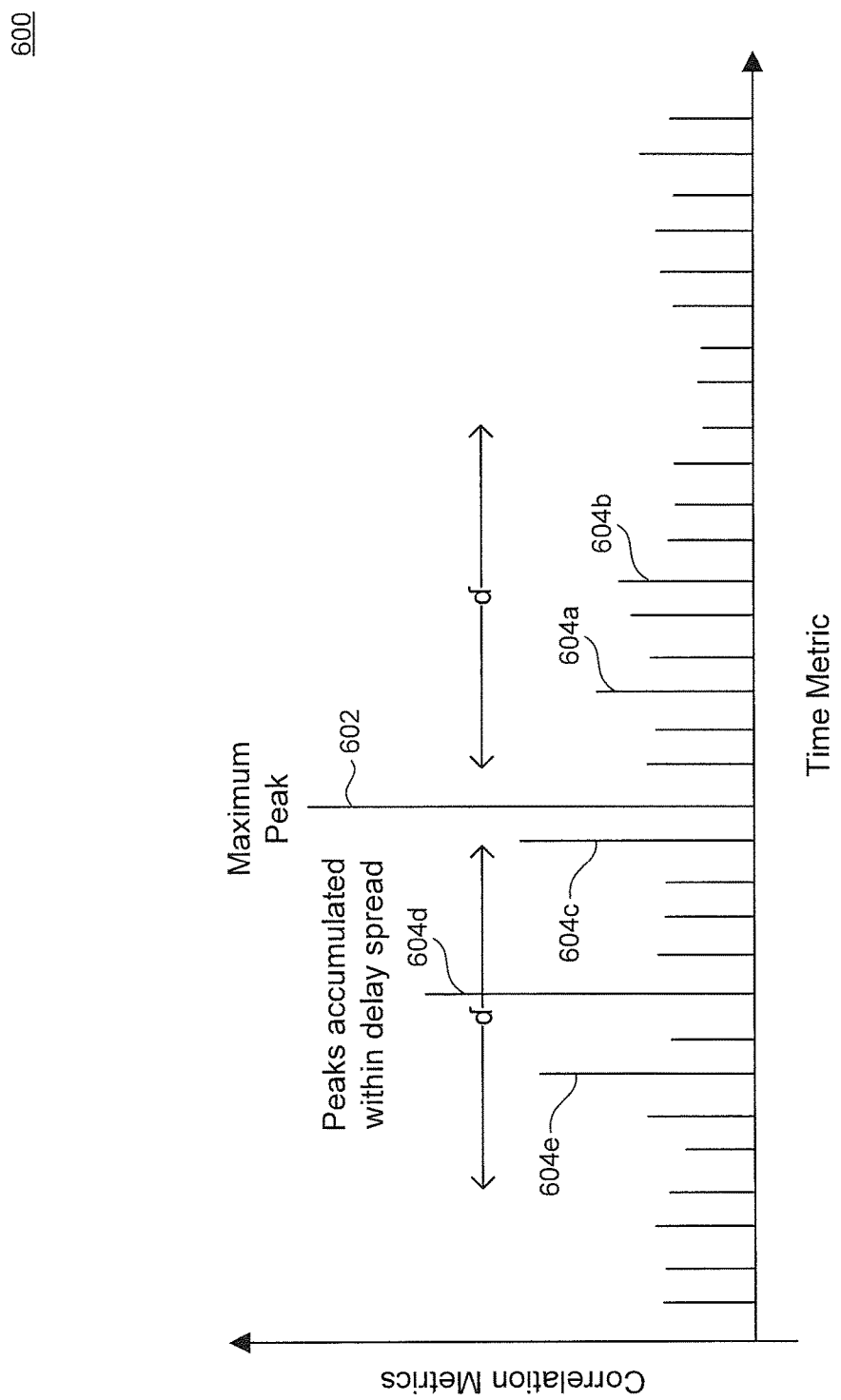
FIG. 6 illustrates an example output of an Inverse Fast Fourier Transform (IFFT).

FIG. 6 illustrates an example IFFT output 600 to illustrate this embodiment. As shown in FIG. 6, example IFFT output 600 includes a maximum peak 602 and significant peaks 604a, 604b, 604c, 604d, and 604e within a delay spread tolerance "d" from the maximum peak 602. In an embodiment, if the correlation metric of a significant peak 604 is above a predetermined threshold, its correlation metric is added to the correlation metric of maximum peak 602 and contributes toward the correlation value. The predetermined threshold may be based on an absolute post IFFT correlation metric or based on noise, e.g., derived from an observed standard deviation. In another embodiment, the correlation metrics of significant peaks above the predetermined threshold are added up to a maximum number of paths. In an embodiment, the maximum number of paths and d are determined using a worst case channel model. For example, if the worst case channel model is considered TU6, then the maximum number of paths is equal to 6 and d is equal to 5 µs.

Returning to FIG. 3, candidate selection block 318 provides the correlation metric associated with the selected time offset candidate to correlation metric validation block 320. Correlation metric validation block 320 compares the correlation metric to a threshold to validate that the correlation metric corresponds to a true detection. The threshold may be determined by simulation to achieve a desired frame erasure rate (FER), or detection rate. If the correlation metric is validated by block 320, the time offset compensated block of samples associated with the selected time offset candidate, and indicating the beginning of the bootstrap of the frame preamble, is provided to the decoder via decoder interface block 222. Otherwise, the detection is considered erroneous and processing returns to delay correlator circuit 204 and coherent correlation circuit 302 to process a subsequent block of samples of input signal 202.

Figure 7:
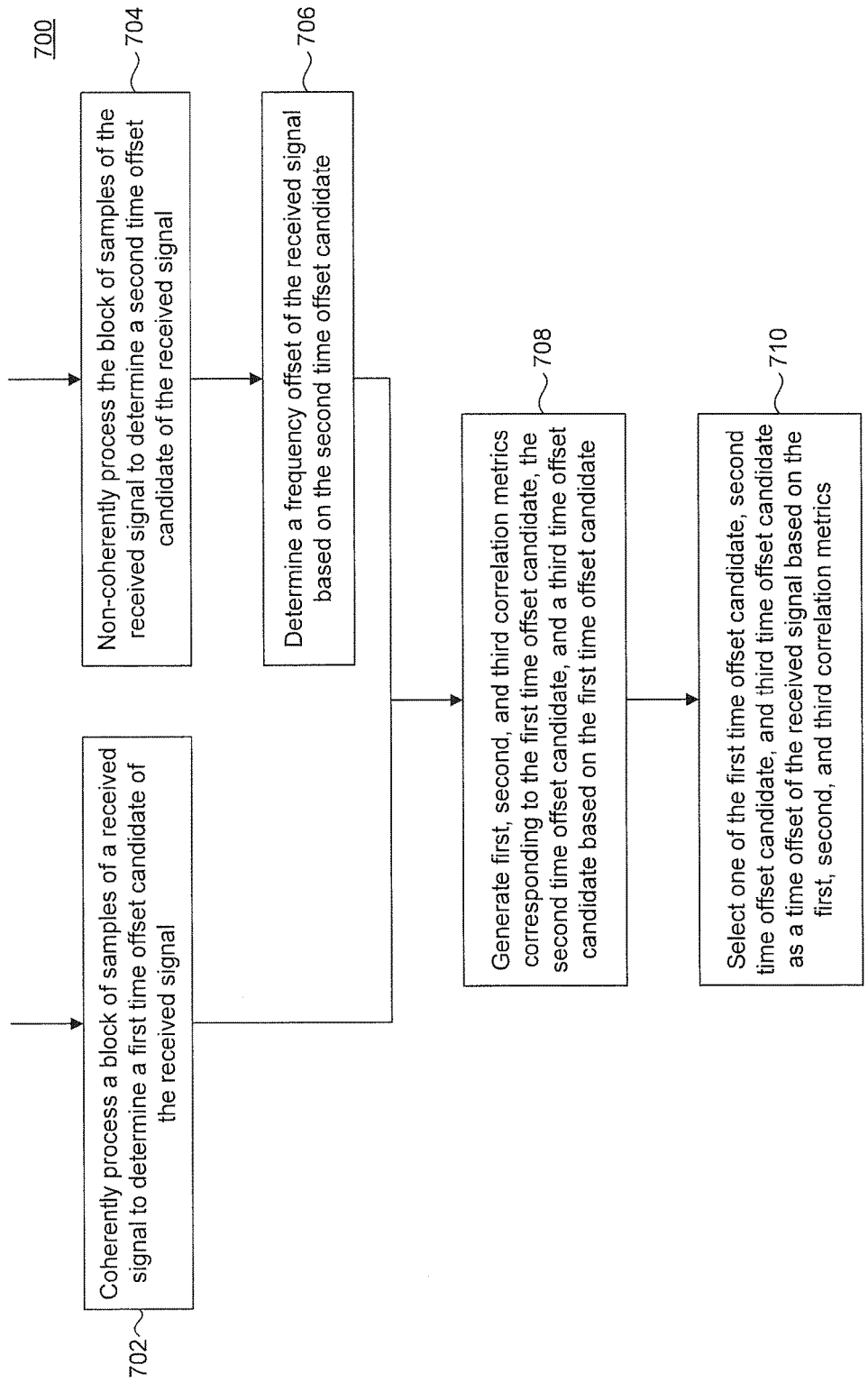
FIG. 7 illustrates an example process according to an embodiment.

FIG. 7 illustrates an example process 700 according to an embodiment. Example process 700 is provided for the purpose of illustration only and is not limiting of embodiments. Example process 700 can be performed by a signal detector, such as example signal detectors 300 and 500 described above, to detect a received signal. The received signal may include a synchronization signal used by the detector to detect the beginning of the received signal. The synchronization signal may be an ATSC 3.0 bootstrap.

As shown in FIG. 7, process 700 begins in steps 702 and 704 which are performed in parallel. Step 702 includes coherently processing a block of samples of the received signal to determine a first time offset candidate of the received signal. In an embodiment, step 702 include correlating the block of samples of the received signal with a local reference signal. The first time offset candidate corresponds to a time offset resulting in a maximum correlation among a plurality of time offsets.

Step 704 includes non-coherently processing the block of samples of the received signal to determine a second time offset candidate of the received signal. In an embodiment, step 704 includes calculating an auto-correlation metric for each sample of the block samples, determining a sample having a maximum auto-correlation metric among the block of samples, and determining the second time offset candidate based on an index associated with the determined sample.

Following step 704, process 700 proceeds to step 706, which includes determining a frequency offset of the received signal based on the second time offset candidate. As discussed above, the second time offset candidate results from the non-coherent processing of the block of samples. In an embodiment, step 706 includes a coherent correlation of a time offset compensated block of samples corresponding to the block of samples compensated based on the second time offset candidate. Accordingly, in an embodiment, step 706 includes performing a Fast Fourier Transform (FFT) on the time offset compensated block of samples to generate frequency domain samples. Then, for each cyclic shift value of a plurality of cyclic shift values, step 706 further includes shifting the frequency domain samples by the cyclic shift value to generate cyclically shifted frequency domain samples; conjugate multiplying the cyclically shifted frequency domain samples by a frequency domain reference signal to generate a conjugate multiplication result; performing an inverse Fast Fourier Transform (IFFT) on the conjugate multiplication result to generate an IFFT output; and determining a correlation value from the IFFT output. In an embodiment, determining the correlation value from the IFFT output include summing a maximum correlation peak and one or more significant peaks corresponding to one or more main paths from the IFFT output. At the end of the search, step 706 includes determining a cyclic shift value having a maximum correlation value from among the plurality of cyclic shift values; and determining the frequency offset of the received signal based on the determined cyclic shift value.

Subsequently, process 700 proceeds to step 708, which includes generating first, second, and third correlation metrics corresponding to the first time offset candidate, the second time offset candidate, and a third time offset candidate based on the first time offset candidate. In an embodiment, an index associated with the third time offset candidate is equal to an index associated with the first time offset candidate minus a sample size of the block of samples.

In an embodiment, the second correlation metric is based on the maximum correlation value determined in step 706. The first and third correlation metrics are each determined by performing a coherent correlation on a respective time compensated block of samples corresponding to the block of samples compensated by the first time offset candidate for the first correlation metric, and by the third time offset candidate for the third correlation metric. In an embodiment, the first and third correlation metrics correspond to a correlation value resulting from the coherent correlation.

In an embodiment, the coherent correlation includes performing a FFT on the time offset compensated block of samples to generate frequency domain samples; conjugate multiplying the frequency domain samples by a frequency domain reference signal to generate a conjugate multiplication result; performing an IFFT on the conjugate multiplication result to generate an IFFT output; and determining a correlation value from the IFFT output.

Process 700 terminates in step 710, which includes selecting one of the first time offset candidate, second time offset candidate, and third time offset candidate as a time offset of the received signal based on the first, second, and third correlation metrics. In an embodiment, the time offset is selected as the time offset candidate with the maximum correlation metric.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments as other embodiments will be apparent to a person of skill in the art based on the teachings herein.

What is claimed is:

1. A signal detector, comprising:
   a coherent detector circuit configured to process a block of samples of a received signal to determine a first time offset candidate of the received signal;
   a non-coherent detector circuit configured to process the block of samples of the received signal, in parallel with the coherent detector circuit, to determine a second time offset candidate of the received signal; and
   an estimation circuit configured to: determine a frequency offset of the received signal based on the second time offset candidate;
   generate first, second, and third correlation metrics corresponding to the first time offset candidate, the second time offset candidate, and a third time offset candidate based on the first time offset candidate; and
   select one of the first time offset candidate, second time offset candidate, and third time offset candidate as a time offset of the received signal based on the first, second, and third correlation metrics.

2. The signal detector of claim 1, wherein the coherent detector circuit is configured to correlate the block of samples of the received signal with a local reference signal.

3. The signal detector of claim 2, wherein the received signal is characterized by a time domain structure having a part C, followed by a part A, followed by a part B, and wherein the local reference signal includes the part A of the time domain structure.

4. The signal detector of claim 1, wherein the block of samples is contiguous and non-overlapping relative to a previous block of samples processed by the coherent detector and a subsequent block of samples to be processed by the coherent detector.

5. The signal detector of claim 1, wherein the first time offset candidate corresponds to a maximum correlation from among a plurality of time offsets.

6. The signal detector of claim 1, wherein the non-coherent detector is configured to:
calculate an auto-correlation metric for each sample of the block of samples; and
determine the second time offset candidate based on an index of a sample having a maximum auto-correlation metric among the block of samples.

7. The signal detector of claim 1, wherein the non-coherent detector is configured to use a priori knowledge of a time domain structure of the received signal to determine the second time offset candidate.

8. The signal detector of claim 1, wherein the estimation circuit is configured to:
perform a Fast Fourier Transform (FFT) on a time offset compensated block of samples, the time offset compensated block of samples corresponding to the block of samples compensated based on the second time offset candidate, to generate frequency domain samples; and
for each cyclic shift value of a plurality of cyclic shift values,
shift the frequency domain samples by the cyclic shift value to generate cyclically shifted frequency domain samples;
conjugate multiply the cyclically shifted frequency domain samples by a frequency domain reference signal to generate a conjugate multiplication result;
perform an inverse Fast Fourier Transform (IFFT) on the conjugate multiplication result to generate an IFFT output; and
determine a correlation value from the IFFT output.

9. The signal detector of claim 8, wherein the estimation circuit is further configured to:
determine a cyclic shift value having a maximum correlation value from among the plurality of cyclic shift values; and
determine the frequency offset of the received signal based on the determined cyclic shift value.

10. The signal detector of claim 9, wherein the second correlation metric is based on the maximum correlation value.

11. The signal detector of claim 8, wherein the estimation circuit is further configured to sum a maximum correlation peak and one or more significant peaks corresponding to one or more main paths from the IFFT output to determine the correlation value.

12. The signal detector of claim 1, wherein the estimation circuit is further configured to:
perform a Fast Fourier Transform (FFT) on a time offset compensated block of samples to generate frequency domain samples;
conjugate multiply the frequency domain samples by a frequency domain reference signal to generate a conjugate multiplication result;
perform an inverse Fast Fourier Transform (IFFT) on the conjugate multiplication result to generate an IFFT output; and
determine a correlation value from the IFFT output.

13. The signal detector of claim 12, wherein the determined correlation value corresponds to the first correlation metric when the time offset compensated block of samples corresponds to the block of samples compensated based on the first time offset candidate, and corresponds to the third correlation metric when the time offset compensated block of samples corresponds to the block of samples compensated based on the third time offset candidate.

14. The signal detector of claim 1, wherein an index associated with the third time offset candidate is equal to an index associated with the first time offset candidate minus a sample size of the block of samples.

15. The signal detector of claim 14, wherein the sample size of the block of samples is 2048.

16. A method of signal detection, comprising:
coherently processing a block of samples of a received signal to determine a first time offset candidate of the received signal;
non-coherently processing the block of samples of the received signal, in parallel with the coherently processing, to determine a second time offset candidate of the received signal;
determining a frequency offset of the received signal based on the second time offset candidate;
generating first, second, and third correlation metrics corresponding to the first time offset candidate, the second time offset candidate, and a third time offset candidate based on the first time offset candidate; and
selecting one of the first time offset candidate, second time offset candidate, and third time offset candidate as a time offset of the received signal based on the first, second, and third correlation metrics.

17. The method of claim 16, further comprising:
calculating an auto-correlation metric for each sample of the block of samples; and
determining the second time offset candidate based on an index of a sample having a maximum auto-correlation metric among the block of samples.

18. The method of claim 16, further comprising:
performing a Fast Fourier Transform (FFT) on a time offset compensated block of samples, the time offset compensated block of samples corresponding to the block of samples compensated based on the second time offset candidate, to generate frequency domain samples; and
for each cyclic shift value of a plurality of cyclic shift values,
shifting the frequency domain samples by the cyclic shift value to generate cyclically shifted frequency domain samples;
conjugate multiplying the cyclically shifted frequency domain samples by a frequency domain reference signal to generate a conjugate multiplication result;
performing an inverse Fast Fourier Transform (IFFT) on the conjugate multiplication result to generate an IFFT output; and
determining a correlation value from the IFFT output.

19. The method of claim 18, further comprising:
determining a cyclic shift value having a maximum correlation value from among the plurality of cyclic shift values; and
determining the frequency offset of the received signal based on the determined cyclic shift value.

20. The method of claim 19, wherein the second correlation metric is based on the maximum correlation value.

21. The method of claim 16, further comprising:
performing a Fast Fourier Transform (FFT) on a time offset compensated block of samples to generate frequency domain samples;
conjugate multiplying the frequency domain samples by a frequency domain reference signal to generate a conjugate multiplication result;

performing an inverse Fast Fourier Transform (IFFT) on the conjugate multiplication result to generate an IFFT output; and determining a correlation value from the IFFT output.

22. The method of claim 21, wherein the determined correlation value corresponds to the first correlation metric when the time offset compensated block of samples corresponds to the block of samples compensated based on the first time offset candidate, and corresponds to the third correlation metric when the time offset compensated block of samples corresponds to the block of samples compensated based on the third time offset candidate.

23. The method of claim 16, wherein an index associated with the third time offset candidate is equal to an index associated with the first time offset candidate minus a sample size of the block of samples.

24. A receiver, comprising:
a signal detector, comprising:
a coherent detector circuit configured to process a block of samples of a received signal to determine a first time offset candidate of the received signal;
a non-coherent detector circuit configured to process the block of samples of the received signal, in parallel with the coherent detector circuit, to determine a second time offset candidate of the received signal; and
an estimation circuit configured to:
determine a frequency offset of the received signal based on the second time offset candidate; and
determine a time offset of the received signal as one of the first time offset candidate, the second time offset candidate, and a third time offset candidate based on the first time offset candidate; and
a decoder configured to decode the block of samples based on the determined frequency offset and the time offset of the received signal.

* * * * *